XR  3,856,534

United Sta
Fletcher et al.

[11] 3,856,534
[45] Dec. 24, 1974

[54] ANTI-FOG COMPOSITION

[76] Inventors: James C. Fletcher, Administrator of the National Aeronautics and Space Administration with respect to an invention of; Harry D. Morrison; Dorrie L. Carmin, Jr., both of Seabrook, Tex.

[22] Filed: Sept. 8, 1971

[21] Appl. No.: 178,771

Related U.S. Application Data

[63] Continuation-in-part of Ser. No. 69,488, Sept. 3, 1970, abandoned.

[52] U.S. Cl. ........... 106/13, 106/15 R, 106/287 SB, 117/124 F, 117/135.5, 252/70, 252/549
[51] Int. Cl. ......................... C09k 3/00, C09k 3/18
[58] Field of Search .......... 106/2, 13, 287; 117/124, 117/135.5; 252/161, 70

[56] References Cited
UNITED STATES PATENTS

| | | | |
|---|---|---|---|
| 1,167,195 | 1/1916 | Matter | 106/15 |
| 1,394,773 | 10/1921 | Kuhn | 106/13 |
| 2,122,514 | 7/1938 | Crocker et al. | 106/15 X |
| 2,292,097 | 8/1942 | Vollmer | 106/13 |
| 2,373,727 | 4/1945 | West | 106/13 |
| 2,414,074 | 1/1947 | Vitalis | 106/13 |
| 3,024,273 | 3/1962 | Whyte et al. | 252/161 X |
| 3,244,541 | 4/1966 | Fain et al. | 252/70 |
| 3,310,494 | 3/1967 | Sproule et al. | 106/13 X |
| 3,342,740 | 9/1967 | Kazmierzak et al. | 106/13 X |
| 3,412,030 | 11/1968 | Wahlberg et al. | 252/70 |
| 3,442,664 | 5/1969 | Heine | 252/70 |
| 3,711,409 | 1/1973 | Ayres et al. | 252/70 |

OTHER PUBLICATIONS

Sisley et al. Encyclopedia of Surface–Active Agents, Vol. II, Chemical Publishing Co. Inc., New York, 1964. TP.990S5 ie. C.3, pages 329, 336, 370, 426 relied on.

*Primary Examiner*—Joseph L. Schofer
*Assistant Examiner*—T. S. Gron
*Attorney, Agent, or Firm*—Russell E. Schlorff; Marvin F. Matthews; John R. Manning

[57] ABSTRACT

A composition for the prevention of fogging on surfaces comprising a surface active agent, water, and an oil time extender.

38 Claims, No Drawings

ANTI-FOG COMPOSITION

CROSS-REFERENCE TO RELATED APPLICATIONS

This application is a continuation-in-part application of application Ser. No. 69,488, filed Sept. 3, 1970, now abandoned.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, U.S.C. 2457).

BACKGROUND OF THE INVENTION

1. Field of the Invention

The present invention relates to novel anti-fog compositions. More particularly, the present invention relates to novel compositions for use on space helmet visors, windshields and the like to prevent fogging of such surfaces and resultant reduced visibility.

2. Brief Description of the Prior Art

One of the problems associated with space flights is that of fogging of the visors in the space suit and the windows in the spacecraft. As observed in the Gemini project, fogging of space suit visors and spacecraft windows, if severe enough, can result in mission abort. At the present time, no definite method or material exists for low-cost effective antifog treating of such surfaces.

In developing an effective anti-fog material for space flight systems, certain criteria must be met. Since the antifog material will frequently be used in an environment rich in oxygen and in many cases in a pure oxygen atmosphere, it is absolutely necessary that the material be oxygen-compatible or more specifically that it be non-reactive in a pure oxygen atmosphere. Secondly, the anti-fog compound must be non-toxic, in the sense that any vapors which might be released from it are not harmful to humans. Obviously, since the anti-fog material is used on visors, spacecraft windows and the like, it must remain clear for extended periods of time so as not to interfere with visual observation. More particularly, however, the anti-fog material must be able to prevent fogging of the visor or such in a maximum work load condition during extra vehicular activity or reduced pressure.

SUMMARY OF THE INVENTION

It is therefore an object of the present invention to provide a composition for preventing fogging of surfaces.

It is another object of the present invention to provide a composition for preventing fogging of surfaces which composition is non-reactive in a substantially pure oxygen atmosphere.

Yet another object of the present invention is to provide an anti-fog composition which is non-toxic.

Another object of the present invention is to provide an anti-fogging composition for use on space suit visors, spacecraft windows and the like which remains free from fogging in maximum work load conditions during extra vehicular activity or reduced pressures.

These and other objects of the present invention will become apparent from the description given herein and the appended claims.

In accordance with the above stated objects, the present invention provides a novel anti-fog composition comprising a surface active agent, water and a time extender in the form of an oil. In general, the surface active agent is present in the composition in amounts ranging from about 6.8 to about 23.8 parts by volume, the water being present in amounts of from about 11.7 to 62.3 parts by volume and the time extender oil being present in amounts of from 0.5 to 15 parts by volume. The above composition when thoroughly mixed and applied to a viewing surface such as a spacecraft window or a space suit visor, will prevent fogging of the surface for periods of 5 hours or greater during maximum metabolic loads.

DESCRIPTION OF THE PREFERRED EMBODIMENTS

The novel anti-fog compositions of the present invention are made up of three components; a surface active agent, water, and an oil which, in cases where fire hazards exist, is fire resistant in a substantially pure oxygen atmosphere.

The surface active agents which have a hydrophilic chain or end group and a lipophilic or oleophilic chain or end group and can be used in the anti-fog compositions of this invention can be anionic, non-ionic, cationic or amphoteric surface active agents.

Suitable examples of surface active agents which can be used are the sodium, potassium and amine alkyl sulfates having from about 8 to 22 carbon atoms in the alkyl chain, such as sodium lauryl sulfate, potassium lauryl sulfate, triethanolamine lauryl sulfate, sodium octyl sulfate, ammonium dodecyl sulfate, potassium hexadecyl sulfate and sodium eicosyl sulfate; the sodium, potassium and amine alkylaryl sulfonates having from about 8 to 22 carbon atoms in the alkyl chain, such as the trimethyl amine salt of dodecyl benzene sulfonic acid, potassium n-dodecyl benzene sulfonate, sodium dodecyl naphthylene sulfonate, and triethanol amine salt of hexadecyl benzene sulfonic acid; the sodium, potassium, and amine salts of the alkyl or alkylaryl polyalkyleneoxy sulfates having from about 8 to 22 carbon atoms in the alkyl chain and from about 1 to 6 alkyleneoxy groups, such as sodium lauryl polyethenoxy sulfate, potassium coconut alkyl polyethynoxy sulfate, and triethanol amine dodecylphenyl polyethenoxy sulfate; the polyalkylene oxide condensates of from about 1 to 6 alkylene oxide units with straight chain alcohols having from about 8 to 22 carbon atoms, with phenols and with alkyl phenols having from about 8 to 22 carbon atoms in the alkyl chain, such as polyoxyethylene lauryl ether, polyoxyethylene cetyl ether, polyoxyethylene oleyl ether, polyoxyethylene nonylphenyl ether, polyoxyethylene octylphenyl ether, polyoxyethylene dodecylphenyl ether; the condensation products of alkyl amines having from about 8 to 22 carbon atoms in the alkyl chain with from about 1 to 6 moles of an alkylene oxide, such as polyethenoxy stearyl amine; tertiary amine oxides such as the diloweralkyl alkyl amine oxides having from about 8 to 22 carbon atoms in the alkyl chain and from about 1 to 4 carbon atoms in the lower alkyl chain, for example, stearyldimethyl amine oxide, dimethyl coconut alkyl amine oxide, diethyl tetradecyl amine oxide, and cetyl dimethyl amine oxide; the quaternary ammonium salts, for example, the diloweralkyl alkyl and dialkyl lower alkyl ammonium salts in which the alkyl group has from about 8 to 22 carbon atoms and the lower alkyl group has from about 1 to 4 carbon atoms, such as tallow dimethyl benzyl ammonium chloride, trimethyl octadecyl ammonium chloride, triethyl dodecyl ammonium bromide, cetylpyridinium ammonium chloride, cetyl trihydroxymethyl ammonium bromide and dimethyl-dicoconut alkyl ammonium chloride; fatty acid amides of fatty acids having from about 8 to 22 carbon atoms and the lower $C_1$—$C_4$ N-substituted derivatives thereof such as coconut fatty acid ethanol amide and tallow fatty acid diethanol amide; the sodium, potassium ammonium and alkylol-substituted ammonium salts of the alkyl glyceryl ether sulfonates having the formula:

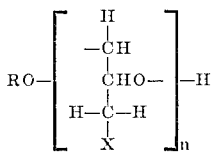

wherein R is an alkyl group of from about 8 to 22 carbon atoms, n is an integer of from 1 to 4 and X is a chlorine atom, a hydroxyl group, and a sulfonic acid group, at least one X being a sulfonic acid group, such as sodium coconut alkyl glyceryl ether sulfonate, potassium cetyl glyceryl ether sulfonate, such as those described in U.S. Pat. No. 3,024,273; and the sulfobetaines, such as dimethyldodecyl ammonio propylsulfate.

The above surface active agents are well known in the art and are commercially available materials. Mixtures of the above surface active agents can be used where desired. Preferred surface active agents are the alkyl sulfates, the alkyl ether sulfates, and the alkyl glyceryl ether sulfates having from 10 to 14 carbon atoms in the alkyl chain. Preferably, the cation of the sulfonic acid salts is either sodium or potassium.

Generally, the surface active agent is present in the compositions in amounts ranging from about 6.8 to about 23.8 parts by volume with amounts from about 10.2 to about 13.6 parts by volume being preferred. Greater and lesser amounts can be used; however, the effectiveness of the anti-fog compositions for extended periods is also somewhat curtailed when amounts outside those specified are used.

The second main component of the anti-fog composition of this invention is water. Although ordinary tap water may be used, it has been found preferable to use distilled or deionized water to reduce the possibility of a film or a coating being formed on the viewing surface due to crystallization of residual minerals in the water. The amount of water present in the anti-fog composition will generally range from about 11.7 to about 62.3 parts and more preferably from about 19.0 to about 31.3 parts by volume.

The oil component of the anti-fog composition disclosed herein serves as a time extender for the composition. The term "oil" as used herein refers to a substance included within the categories of (a) petroleum or mineral or hydrocarbon oils derived from crude petroleum, (b) fatty oils, also called fixed oils, such as mono-, di- and tri-glyceride esters, generally of straight chain fatty acids having from about 8 to 22 carbon atoms, such as lauric, palmitic, stearic, oleic, linoleic and linolenic acids, derived from vegetable or animal fats, oils or similar materials, (c) essential oils derived from plants such as the terpenes, pinenes and dipentenes and (d) certain synthetic, fire resistant oils containing phosphorus, silicon, etc. For general use in environments where no fire hazards exist, any of the above oils is satisfactory. However, in certain cases such as in space flight systems the oils of class (d) are preferred.

In general, the oils which are suitable for use in the present invention are those which have a boiling point greater than 150°C. Included within the class of suitable hydrocarbon or mineral oils derivable from petroleums are the various aliphatic, olefinic, alicyclic, cyclic, and aromatic oils or mixtures of such.

Suitable fatty oils or fixed oils include materials such as coconut oil and palm oil, tall oil and linseed oil, as well as fatty acids having from about 8 to 22 carbon atoms such as those having the general formula $C_nH_{2n+1}COOH$, for example, lauric, palmitic and stearic acids; fatty alcohols both naturally occurring and those prepared by the so-called OXO process having from about 8 to 22 carbon atoms such as octyl, lauryl, decyl, myristyl, cetyl and stearyl alcohols; fatty esters such as the above-described mono-, di- and triglyceride esters of fatty acids having from about 8 to 22 carbon atoms and the lower alkyl $C_1$-$C_4$ esters of these fatty acids, e.g., methylpalmitate and other such materials derived from animal and vegetable sources.

The essential oils suitable for use in the present invention include those oils derived from plants which are usually characterized as carrying the essential odor or flavor of the plant from which they are extracted. Chemically, essential oils are often principally terpenes although many other classes of compounds such as the pinenes and dipentenes are also present.

As described above, when the anti-fog composition disclosed herein is to be used in an environment where fire-resistance is a necessity, the most useful class of oils are various synthetic oils containing such elements as phosphorus and silicon. These oils may be referred to as oxygen compatible oils where "oxygen compatible" denotes a material which is substantially non-reactive in a pure oxygen atmosphere.

Suitable oxygen compatible oils containing silicon and phosphorus are the silicon oils and the organophosphate esters. Any of thes materials can be used as the time extender oil providing they have a boiling point about 150°C.

Suitable silicon oils which can be used in the anti-fog composition of this invention are the polysiloxanes which are polymers having repeating units of the following group $(R_2SiO)_n$, wherein R is an aliphatic or aromatic group having from about 1 to 8 carbon atoms and n ranges from about 2 to 20. Examples of R are methyl, ethyl, and phenyl. These materials are organo polysiloxanes, are well known and are commercially available; for example, the AF series, trade names of the General Electric Company, and DC-200, a trade name of the Dow-Corning Company.

Suitable organophosphate esters which can be used in the anti-fog composition of this invention are those having the formula $R_3PO_3$ in which R is an aliphatic or aromatic group, having from about 1 to 8 carbon atoms. Specific examples of these materials are trimethylphosphate, triethylphosphate, triphenylphosphate. These organo phosphate esters are well known and commercially available, for example, the Gafac series, a trade name of the GAF Corporation.

Although, as mentioned, materials such as the silicon based oils are suitable for use in the present invention, the preferred fire-resistant oils are the phosphate esters, particularly materials such as triaryl phosphates. A preferred class of triaryl phosphates are those derived from cresylic acid. Phosphate esters of this type may be conveniently prepared by the reaction of cresylic acid and phosphorus oxychloride using procedures well known in the art. The term "cresylic acid" refers to mixtures of phenolic materials boiling generally above the cresol range and derived from either petroleum or coal tar sources. A typical commercial cut of cresylic acid will have a boiling point ranging from 220° to 250°C and a composition as follows: meta, para-cresols, 0 to 1 percent; 2,4 and 2,5-xylenols, 0 to 3 percent; 2,3 and 3,5-xylenols, 10–20 percent; 3,4-xylenol, 20 to 30 percent and $C_9$ phenols, 50 to 60 percent. The preparation of triaryl phosphates from cresylic acid results in a wide variety of phosphate esters of varying viscosities. Although the viscosity of the particular phosphate ester derived from these cresylic acids is not critical, it has been found that a preferred phosphate ester for use in preparing the compositions of the present invention is one having a viscosity of from around 200 to 230 Saybolt Universal Seconds (SUS) at 100°F as measured by ASTM Method D445-53T. The phosphate esters derived from cresylic acid are ideally suited for use in the present invention inasmuch as: they have extremely low vapor pressures making their toxicity from an inhalation point of view virtually negligible; they are extremely fire resistant even in pure oxygen atmosphere; and they remain clear and stable for long periods of time when spread on the viewing surface. In preparing the anti-fog compositions of the present invention, the oil will be present in amounts ranging from about 0.5 to 15, preferably aboiut 2 to 6, parts by volume.

To prepare the anti-fog composition of the present invention, it is only necessary to mix the appropriate amounts of the detergent, the water, and the oil and agitate the components until the solution is completely emulsified. In use, the emulsified mixture is applied in a thin coat to the surface to be protected after which the surface is buffed with a lint free cloth until it is clear. Coatings applied in this fashion have been found to remain clear from fogging in maximum work load conditions during extra vehicular activity.

To further explain and demonstrate the present invention, the following non-limiting examples are presented:

EXAMPLE 1

As the surface active agent, 35 parts by volume of a commercially available detergent, Lemon Fresh Joy, (34 percent active) a trade mark of the Procter & Gamble Co., Cincinnati, Ohio, and containing by weight 25 percent of the ammonium salt of coconut alkyl ether sulfonate containing 3 ethenoxy units, 4 percent of the sodium salt of coconut alkyl glycerol ether sulfonate, 5 percent of dimethyldodecyl amine oxide, 9 percent ethyl alcohol 3.7 percent miscellaneous, including inorganic salts, perfume, unsulphonated material, and the remainder (53.3 percent) being water, were mixed with 5 parts by volume of deionized water and 7 parts by volume of Cellulube 220, a phosphate ester derived from cresylic acid having a viscosity of 220 Saybolt Universal Seconds at 100° F, a trade name of the Stauffer Chemical Company, New York, N.Y. The mixture was shaken until it was completely emulsified. The composition was evaluated on a special helmet anti-fog test device. The helmet anti-fog test device consists of a space suit helmet having attached thereto a mechanical system to simulate metabolic rate. In order to control dew point temperatures internally and externally of the helmet, various heating and cooling coils are disposed within and outside the helmet. A primary life support system supplies air to the test helmet. In other words, the primary life support system provides the life environment which would be present were a human being wearing the helmet. In the example set forth herein, the primary life support system supplied air, the following parameters being used:

1. Flow Rate 5.62 Standard Cubic Feet per Minute (SCFM)
2. Dry Bulb Temperature 53°F
3. Dew Point Temperature 46°F The mechanical lung device which in effect supplies the exhaled air internally of the helmet was also operated on air received from the primary life support system and operated with the following parameters:

1. Flow Rate 5.48 SCFM
2. Dry Bulb Temperature 90.5°F
3. Dew Point Temperature 90.0°F The chamber temperature external of the helmet was initially fixed at 40°F and was decreased slowly until fogging began to appear on the internal untreated helmet area. In order to prevent fogging on the external surface of the helmet visor, to dry nitrogen purge was blown over the visor surface.

Using the above stated conditions, the visor area containing the anti-fog composition of Example 1 remained clear from excessive fogging for approximately 2½ hours.

When in the above example other surface active agents such as sodium lauryl sulfate, potassium lauryl sulfate, triethanolamine lauryl sulfate, sodium octyl sulfate, ammonium dodecyl sulfate, potassium hexadecyl sulfate, sodium eicosyl sulfate, trimethyl amine salt of dodecyl benzene sulfonic acid, potassium n-dodecyl benzene sulfonate, sodium dodecyl naphthylene sulfonate, the triethanol amine salt of hexadecyl benzene sulfonic acid, sodium lauryl polyethenoxy sulfate, potassium coconut alky polyethenoxy sulfate, triethanol amine dodecylphenyl polyethenoxy sulfate, polyoxyethylene lauryl ether, polyoxyethylene cetyl ether, polyoxyethylene oleyl ether, polyoxyethylene nonylphenyl ether, polyoxyethylene octylphenyl ether, polyoxyethylene dodecylphenyl ether, polyethenoxy stearyl amine, stearyldimethyl amine oxide, dimethyl coconut alkyl amine oxide, diethyl tetradecyl amine oxide, cetyl dimethyl amine oxide, tallow dimethyl benzyl ammonium chloride, trimethyl octadecyl ammonium chloride, triethyl dodecyl ammonium bromide, cetylpyridinium ammonium chloride, cetyl trihydroxymethyl ammonium bromide, dimethyldicoconut alkyl ammonium chloride, coconut fatty acid ethanol amide, tallow fatty acid diethanol amide, sodium coconut alkyl glyceryl ether sulfonate, potassium cetyl glyceryl ether sulfonate, and dimethyldodecyl ammonia propyl sulfate are substituted for the mixture of surface active agents used above in Example 1, compositions having anti-fog properties are obtained.

EXAMPLE 2

The procedure of Example 1 was repeated using a composition coimprised of 35 volumes of the detergent set forth in Example 1, 5 volumes of deionized water, and 10 volumes of Cellulube 220. Using the composition of Example 2, the helmet visor remained clear from fogging for up to 5 hours.

When in the above Example other time extender oils having a boiling point of above 150°C such as coconut oil, palm oil, tall oil, linseed oil, lauric acid, palmitic acid, stearic acid, octyl alcohol, lauryl alcohol, decyl alcohol, myristyl alcohol, cetyl alcohol, stearyl alcohol, methyl palmitate, a terpene, dimethyl siloxane, polyphenylsiloxane, trimethylphosphate, triethyl phosphate and triphenyl phosphate are substituted for the organic phosphate ester used in the above example, compositions having anti-fog properties are obtained.

EXAMPLE 3

The procedure of Example 1 was repeated using a composition comprised of 35 volumes of the detergent set forth in Example 1, 5 volumes of deionized water, and 4 volumes of Cellulube 220. Using this composition, the helmet visor remained clear from fogging for over 5 hours.

As the above examples clearly demonstrate, the composition of the present invention is extremely effective in reducing the fogging of space suit visors under maximum metabolic conditions. In addition, the extremely low volatility of the phosphate esters employed in embodiments described herein renders such compositions virtually non-toxic from an inhalation point of view. The phosphate ester compositions have been found to be virtually non-reactive when tested in essentially pure oxygen environments thus making them eminently suited for use in space flight operations.

While in the description sets forth herein the use of anti-fog compositions has been described with particular reference to space flight environments, it is to be understood that their usefulness is not so limited. For example, the compositions can be used to prevent fogging of windshields of automobiles, motorcycle crash helmets, firemen's helmets and in fact can be used on virtually any surface where it is desired to maintain a fog free condition. The compositions herein are effective and can be used on transparent plastic materials as well as glass and indeed can be used on aluminum and other reflective surfaces to prevent fogging.

What is claimed is:

1. An anti-fog composition for application to viewing surfaces consisting essentially of from about 6.8 to 23.8 parts by volume of a surface active agent; from 11.7 to 62.3 parts by volume of water; and from 0.5 to 15 parts by volume of an oil time extender selected from the group consisting of a substantially water-insoluble organopolysiloxane having the formula $(R_2SiO)_n$ wherein R is an aliphatic or aromatic hydrocarbon group having from about 1 to 8 carbon atoms and wherein n ranges from 2 to 20 and an organophosphate ester having the formula $R_3PO_3$ wherein R is an aliphatic or aromatic hydrocarbon group having from about 1 to 8 carbon atoms.

2. The composition of claim 1, wherein said surface active agent is selected from the group consisting of anionic surface active agents, nonionic surface active agents, cationic surface active agents, amphoteric surface active agents, and ionic charge compatible mixtures thereof.

3. The composition of claim 2, wherein said surface active agent is an anionic surface active agent.

4. The composition of claim 3, wherein said anionic surface active agent is selected from the group consisting of the sodium, potassium and amine alkyl sulfates having from about 8 to 22 carbon atoms in the alkyl chain; the sodium, potassium and amine alkyl aryl sulfonates having from about 8 to 22 carbon atoms in the alkyl chain; the sodium, potassium and amine alkyl polyalkyleneoxy sulfates having from about 8 to 22 carbon atoms in the alkyl chain and from about 1 to 6 alkyleneoxy groups; the sodium, potassium and amine alkylaryl polyalkyleneoxy sulfates having from about 8 to 22 carbon atoms in the alkyl chain and from about 1 to 6 alkyleneoxy groups; and the alkyl glyceryl ether sulfonates having the formula:

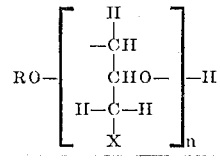

wherein R is an alkyl group of from about 8 to 22 carbon atoms, n is an integer of from 1 to 4 and X is a chlorine atom, a hydroxyl group, and a sulfonic acid group, at least one X being a sulfonic acid group.

5. The composition of claim 4, wherein the cation of said anionic surface active agent is sodium or potassium.

6. The composition of claim 4, wherein said cation is sodium.

7. The composition of claim 2, wherein said surface active agent is a non-ionic surface active agent.

8. The composition of claim 7, wherein said nonionic surface active agent is selected from the group consisting of a polyalkylene oxide condensate of from about 1 to 6 alkylene oxide units with straight chain alcohols having from about 8 to 22 carbon atoms, a polyalkylene oxide condensate of from about 1 to 6 alkylene oxide units with a phenol; a polyalkylene oxide condensate of from about 1 to 6 alkylene oxide units with an alkyl phenol having from about 8 to 22 carbon atoms in the alkyl chain; a condensation product of an alkylamine having from about 8 to 22 carbon atoms in the alkyl chain with from about 1 to 6 moles of an alkylene oxide; a diloweralkyl alkyl amine oxoxide having from about 8 to 22 carbon atoms in the alkyl chain and from about 1 to 4 carbon atoms in the lower alkyl chain; a fatty acid amide, said fatty acid amide having from about 8 to 22 carbon atoms in said fatty acid; and a N-loweralkyl substituted fatty acid amide, said fatty acid amide having from about 8 to 22 carbon atoms in said fatty acid and from about 1 to 4 carbon atoms in said loweralkyl group.

9. The composition of claim 2, wherein said surface active agent is a cationic surface active agent.

10. The composition of claim 9, wherein said cationic surface active agent is selected from the group consisting of a quaternary ammonium salt having at least one alkyl group of from about 8 to 22 carbon atoms; a diloweralkyl alkyl benzyl ammonium salt, said alkyl group having from about 8 to 22 carbon atoms and said loweralkyl group having from about 1 to 4 carbon atoms; and an alkyl heterocyclic ammonium salt, said alkyl group having from about 8 to 22 carbon atoms.

11. The composition of claim 1, wherein said organophosphate ester is a triaryl phosphate derived from cresylic acid.

12. The composition of claim 1, wherein said water is deionized water.

13. The composition of claim 1, wherein said surface active agent is a mixture of a sodium, potassium, or amine alkylpolyalkyleneoxysulfate having from about 8 to 22 carbon atoms in the alkyl chain and from about 1 to 6 alkyleneoxy groups, a diloweralkyl alkyl amine oxide having from about 1 to 4 carbon atoms in the loweralkyl chain, and a sodium, potassium, or amine alkyl glyceryl ether sulfonate having the formula:

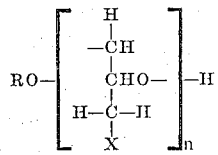

wherein R is an alkyl chain of from about 8 to 22 carbon atoms, n is an integer of from 1 to 4 and X is a chlorine atom, a hydroxyl group or a sulfonic acid group, at least one X being a sulfonic acid group.

14. The composition of claim 13, wherein said surface active agent is present in an amount of from about 6.8 to about 23.8 parts by volume, wherein the weight ratio of said surface active agent mixture is about 25 parts of said alkylpolyalkyleneoxysulfate to about 5 parts of said amine oxide to about 4 parts of said alkylglyceryl ether sulfonate.

15. The composition of claim 14, wherein said alkylpolyalkyleneoxy sulfate is an alkylpolyethyleneoxy sulfate.

16. The composition of claim 13, wherein said oil is a fire resistant oil present in an amount of from about 2 to about 6 parts by volume, said oil comprising a triaryl phosphate derived from cresylic acid and having a viscosity of approximately 220 SUS at 100°F.

17. The composition of claim 16, wherein said water is present in an amount of from 19.0 to about 31.3 parts by volume.

18. The composition of claim 17, wherein said alkyl chain of alkylpolyalkyleneoxysulfate and alkyl glyceryl ether sulfonate has from about 10 to 14 carbon atoms.

19. The composition of claim 1, wherein said surface active agent is an ionic charge compatible mixture of anionic surace active agents, cationic surface active agents, and nonionic surface active agents.

20. An anti-fog composition for application to viewing surfaces consisting essentially of 35 parts by volume of an aqueous detergent which comprises 34 percent surface active agent mixture and 53.3 percent water; 5 parts by volume of deionized water; and 4 to 10 parts by volume of an oil time extender selected from the group consisting of a substantially water-insoluble organopolysiloxane having the formula $(R_2SiO)_n$ wherein R is an aliphatic or aromatic hydrocarbon group having from about 1 to 8 carbon atoms and wherein n ranges from 2 to 20 and an organophosphate ester having the formula $R_3PO_3$ wherein R is an aliphatic or aromatic hydrocarbon group having from about 1 to 8 carbon atoms.

21. The composition of claim 20, wherein said surface active agent is a mixture of a sodium, potassium, or amine alkylpolyalkyleneoxysulfate having from about 8 to 22 carbon atoms in the alkyl chain and from about 1 to 6 alkyleneoxy groups, a diloweralkyl alkyl amine oxide having from about 1 to 4 carbon atoms in the loweralkyl chain, and a sodium, potassium, or amine alkyl glyceryl ether sulfonate having the formula:

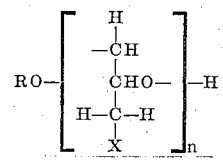

wherein R is an alkyl chain of from about 8 to 22 carbon atoms, n is an integer of from 1 to 4 and X is a chlorine atom, a hydroxyl group or a sulfonic acid group, at least one X being a sulfonic acid group.

22. The composition of claim 21, wherein the weight ratio of said surface active agent mixture is about 25 parts of said alkylpolyalkyleneoxysulfate to about 5 parts of said amine oxide to about 4 parts of said alkylglyceryl ether sulfonate.

23. The composition of claim 22, wherein said alkylpolyalkyleneoxysulfate is an alkylpolyethyleneoxysulfate.

24. The composition of claim 20, wherein said oil time extender is said substantially water-insoluble organopolysiloxane.

25. The composition of claim 20, wherein said oil time extender is said organophosphate ester.

26. The composition of claim 25, wherein said organophosphate ester comprises a triarylphosphate derived from cresylic acid and having a viscosity of approximately 220 SUS at 100°F.

27. The composition of claim 26 wherein said alkyl chain in said alkylpolyalkyleneoxysulfate has from about 10 to 14 carbon atoms.

28. The composition of claim 25, wherein 4 parts by volume of said oil time extender is present.

29. The composition of claim 1, wherein said oil time extender is said substantially water insoluble organopolysiloxane.

30. The composition of claim 1, wherein said oil time extender is said organophosphate ester.

31. A process for preventing fogging on viewing surfaces which comprises; applying to said viewing surface a thin coat of an anti-fog composition consisting essentially of from about 6.8 to 23.8 parts by volume of a surface active agent; from 11.7 to 62.3 parts by volume oif water; and from 0.5 to 15 parts by volume of an oil time extender selected from the group consisting of a substantially water-insoluble organopolysiloxane having the formula $(R_2SiO)_n$, wherein R is an aliphatic or aromatic hydrocarbon group having from about 1 to 8 carbon atoms and wherein n ranges from 2 to 20, and an organophosphate ester having the formula $R_3PO_3$, wherein R is an aliphatic or aromatic hydrocarbon group having from about 1 to 8 carbon atoms and thereafter buffing said viewing surface until it is clear.

32. The process of claim 31 wherein said anti-fog composition consists essentially of an emulsified mixture of 35 parts by volume of an aqueous detergent which comprises 34 percent surface active agent and 53.3 percent water; 5 parts by volume of deionized water; and 4 to 10 parts by volume of said oil time extender.

33. The process of claim 31, wherein said surface active agent is a mixture of a sodium, potassium, or amine alkylpolyalkyleneoxysulfate having from about 8 to 22 carbon atoms in the alkyl chain and from about 1 to 6 alkyleneoxy groups, a diloweralkyl alkyl amine oxide having from about 1 to 4 carbon atoms in the loweralkyl chain, and a sodium, potassium, or amine alkyl glyceryl ether sulfonate having the formula:

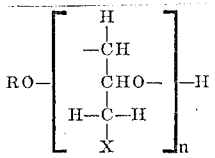

wherein R is an alkyl chain of from about 8 to 22 carbon atoms, n is an integer of from 1 to 4 and X is a chlorine atom, a hydroxyl group or a sulfonic acid group, at least one X being a sulfonic acid group.

34. The process of claim 33, wherein the weight ratio of said surface active agent mixture is about 25 parts of said alkylpolyalkyleneoxysulfate to about 5 parts of said amine oxide to about 4 parts of said alkyl glyceryl ether sulfate.

35. The process of claim 34 wherein 4 parts by volume of said oil time extender is present.

36. The process of claim 35, wherein said oil time extender is said substantially water insoluble organopolysiloxane.

37. The process of claim 33, wherein said oil time extender is said organophosphate ester.

38. The process of claim 37, wherein said organophosphate ester is a triarylphosphate derived from cresylic acid.

* * * * *

UNITED STATES PATENT AND TRADEMARK OFFICE
CERTIFICATE OF CORRECTION

PATENT NO. : 3,856,534
DATED : December 24, 1974
INVENTOR(S) : James C. Fletcher et al It is certified that error appears in the above-identified patent and that said Letters Patent are hereby corrected as shown below:

Column 4, line 62, change formula from [ $R_3PO_3$ ]

to ---- $R_3PO_4$ ---- .

Column 7, line 62, claim 1, line 11 of that claim, change the formula from [ $R_3PO_3$ ]

to ---- $R_3PO_4$ ----.

Signed and Sealed this third Day of February 1976

[SEAL]

Attest:

RUTH C. MASON
*Attesting Officer*

C. MARSHALL DANN
*Commissioner of Patents and Trademarks*